(No Model.) 2 Sheets—Sheet 1.
P. D. VAN VRADENBURG.
CAR BRAKE.
No. 517,904. Patented Apr. 10, 1894.
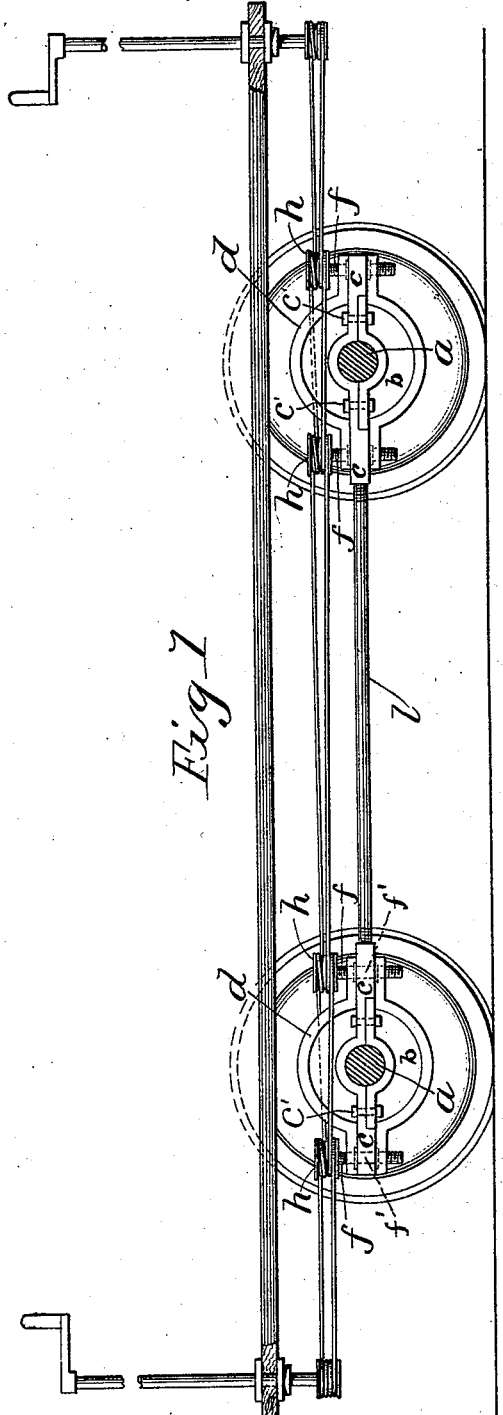
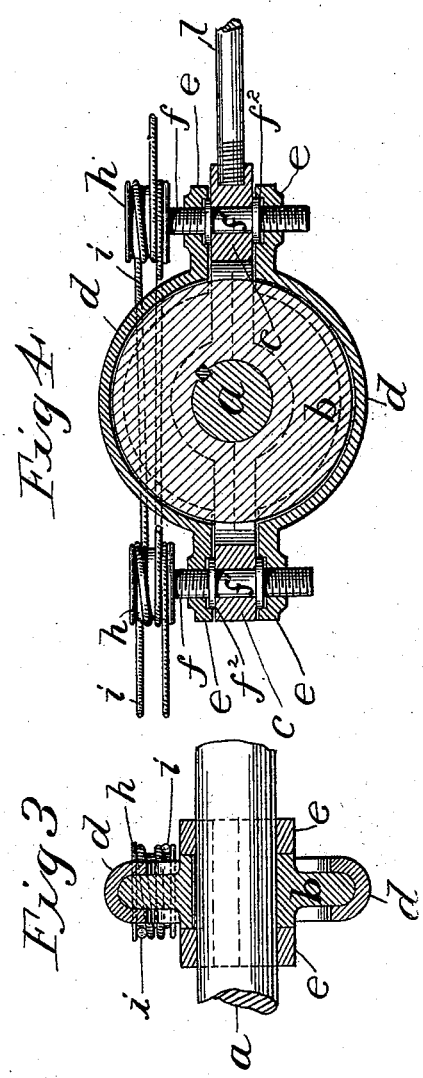
Witnesses
Inventor:
Peter D. Van Vradenburg
per DuBois & DuBois
Attorneys.

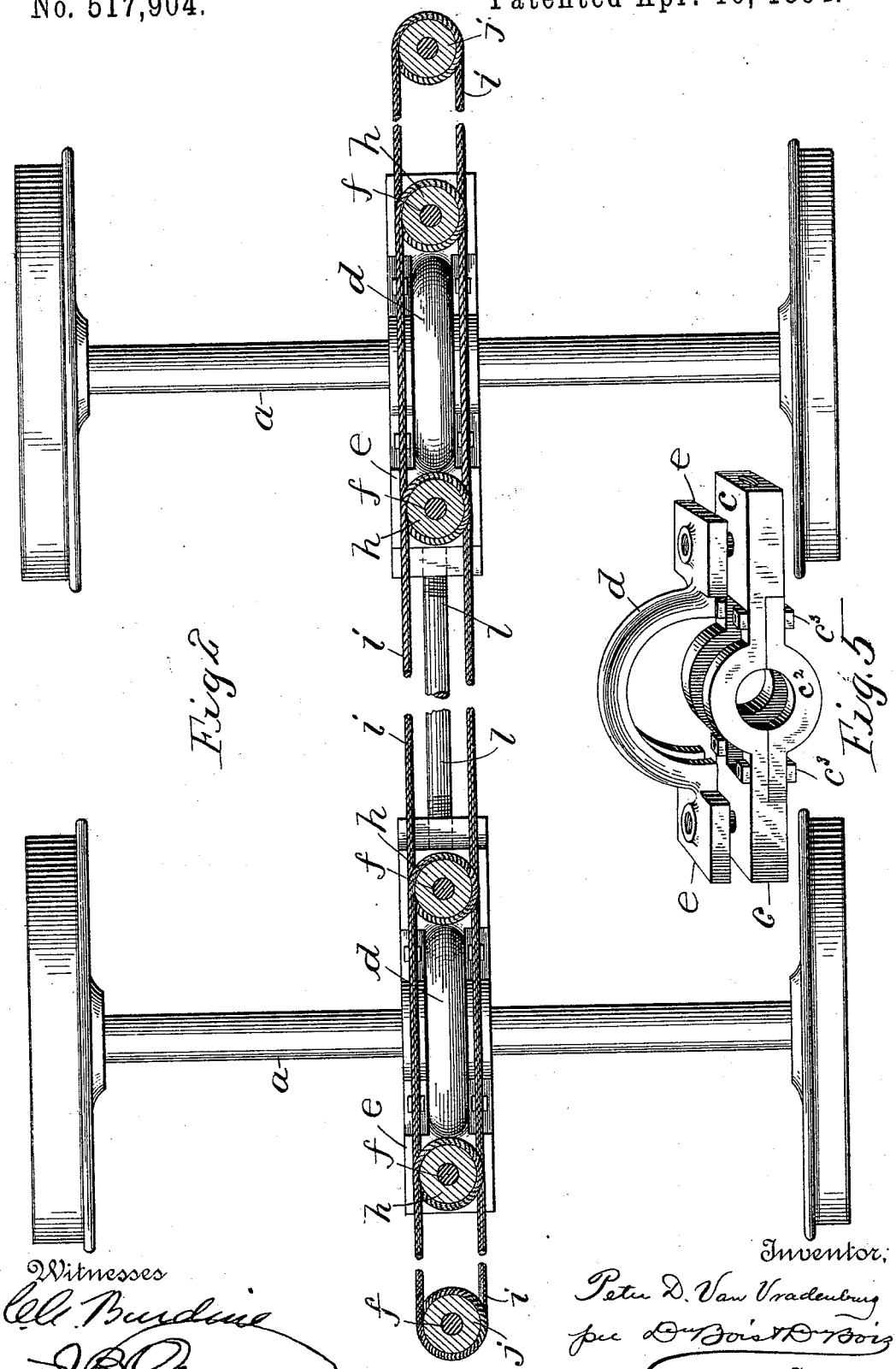

UNITED STATES PATENT OFFICE.

PETER D. VAN VRADENBURG, OF BINGHAMTON, NEW YORK.

CAR-BRAKE.

SPECIFICATION forming part of Letters Patent No. 517,904, dated April 10, 1894.

Application filed September 7, 1893. Serial No. 485,012. (No model.)

*To all whom it may concern:*

Be it known that I, PETER D. VAN VRADENBURG, a citizen of the United States, residing at Binghamton, in the county of Broome and State of New York, have invented certain new and useful Improvements in Car-Brakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has particular reference to that class of vehicle brakes wherein a pair of right and left screws operate in conjunction with suitable mechanism to release and apply the brake shoes.

My purpose is to provide a more simple, practical, and desirable mechanism than that heretofore employed.

With this purpose in view, my invention consists in the employment of right and left screws in connection with winding drums attached to the screws, and clamping shoes peculiarly combined and arranged in connection with the running gear, all of which will be more fully described hereinafter and pointed out in the claims.

In the accompanying drawings: Figure 1 represents a side elevation of my invention; Fig. 2, a plan thereof; Fig. 3, a sectional end view of the clamping shoes, the friction wheel to which they are applied, and some of their adjacent parts; Fig. 4, a side elevation of the friction wheel, and its immediate co-operating parts; and Fig. 5, a perspective view of one of the shoes and frames detached.

In the present instance my device is shown applied to the running gear of an ordinary street car, although it is susceptible of use upon all kinds of vehicles.

The reference letter $a$ denotes the car axle, which is fixed to revolve with the wheel in the usual way. On the axle is keyed or suitably fixed a friction wheel or disk $b$. A horizontal frame $c$ embraces the disk and axle, and is provided with two separable sections $c^2$ suitably held together by bolts $c^3$. On opposite sides of this frame, and embracing the periphery of the friction wheel $b$ are placed two clamping shoes $d$. These are semi-circular in cross-section, to correspond with the circular periphery of the disk which fits in the concavity of the shoes whereby an increased frictional area is provided for the purpose of more easily arresting the rotation of the disk and hence the axle. Each shoe is semi-circular or grooved and embraces almost one entire half of the periphery of the disk, the two forming almost a continuous band around the disk, and they are each provided with two lateral projections $e$, which overlap the frame $c$, and receive the bolts or screws $f$. The bolt holes in the projections $e$ are threaded to co-operate with threads on the bolts. The central exterior portion $f'$ of each bolt is smooth, and passes through smooth bored holes in the frame $c$. Washers $f^2$ are fixed to each bolt to hold it securely in place and against endwise movement in the frame, and at the same time allowing the bolt to revolve freely therein. Above and below the washers the bolt is provided with right and left screw threads, respectively, which, when the bolts are turned, move the shoes toward and away from the disk. Each bolt is actuated by a flanged drum $h$ which receives one or more coils of an endless cable $i$. This cable extends from end to end of the car and passes over flanged drums $j$, on the ends of brake rods $k$, located on the front and rear platforms. A horizontal rod $l$ connects the two frames $c$, and is provided with right and left screw threads $l'$ to allow the frames to be adjusted toward and from each other.

The mechanism just described is shown in the drawings as applied to two axles, but it can be applied to a greater or less number when desired.

Having set forth the preferred construction of my device, I will now briefly describe its operation.

Assuming that the clamping shoes $d$ are clear of the friction wheel $b$, and it is desired to apply the brakes, this is accomplished by turning the brake rod $k$, on the right hand end of the car, which rod rotates the drum on its lower end thereby imparting to the four drums a corresponding movement, and this movement turns the screws and draws the clamping shoes tightly against the periphery of the disks. A contrary movement produces a contrary effect, and the brakes are released.

Among the advantages claimed for this device are: that the wear of the brake-shoes does not come upon the tread of the wheels; that it is cheap and easily applied to any ordinary car or vehicle, and can be operated with the greatest ease.

Having thus described my invention, what I claim as new, and desire to secure by Letters Patent, is—

1. In a brake for vehicles, a disk or wheel secured to revolve in unison with the traction wheels, in combination with a pair of clamping shoes embracing the disk, right and left screws adapted to actuate the shoes toward and away from the disk, and cables, substantially as described, for actuating the screws as set forth.

2. In combination with the axle of a vehicle, a disk or wheel secured to rotate therewith, clamping shoes embracing the disk or wheel, and having lateral projections with threaded holes, right and left screws passing through the holes, drums upon said screws, and cables for actuating the drums, all arranged and adapted to operate in the manner and for the purpose set forth.

3. In a vehicle braking mechanism, the combination with the axle of the vehicle, of a wheel or disk fixed thereon, a horizontally disposed frame surrounding the disk or wheel, semi-circular clamping shoes embracing the latter, said shoes being provided with lateral projections having threaded holes therein, vertical screws having right and left threads engaging those in the projections, said screws being smooth where they pass through the frame, whereby they revolve freely therein, drums fixed on the screws, and a cable passing around the drums and on to the brake rods, in the manner set forth.

4. In a vehicle braking mechanism, the combination with the wheel axle, of a friction disk fixed thereto having a convex periphery, grooved clamping shoes adapted to fit and engage said periphery, right and left screws applied to and operating the shoes, and means, substantially as described, for actuating the screws, in the manner and for the purpose set forth.

In testimony whereof I affix my signature in presence of two witnesses.

PETER D. VAN VRADENBURG.

Witnesses:
ARTHUR A. VANCE,
ALBERT S. BARNES.